Dec. 15, 1970 R. K. SHEEHAN 3,546,750
FASTENER
Filed Oct. 25, 1968 2 Sheets-Sheet 1
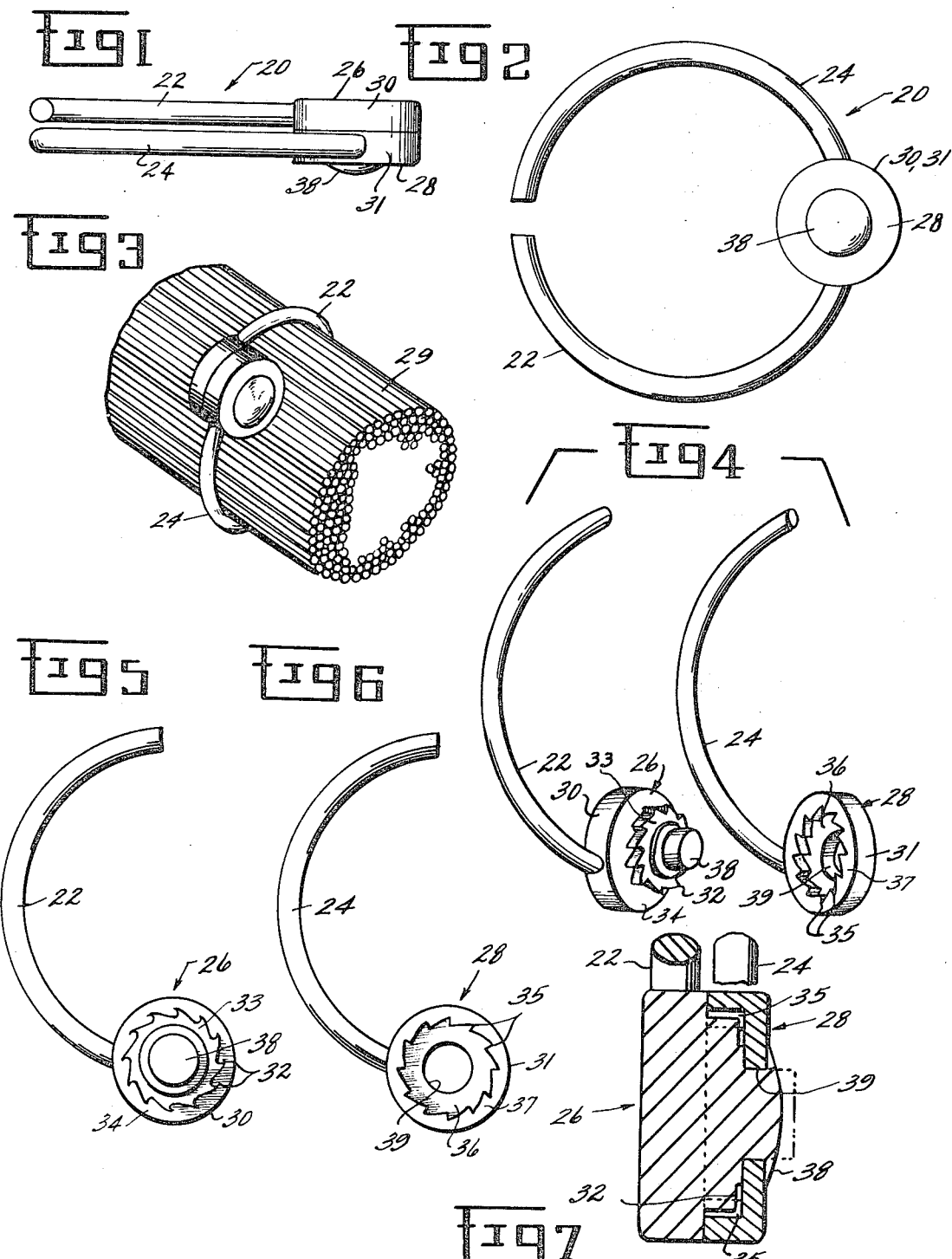
INVENTOR.
ROBERT K. SHEEHAN
BY
Pearce and Schaeperklaus
ATTORNEYS Dec. 15, 1970 R. K. SHEEHAN 3,546,750
FASTENER
Filed Oct. 25, 1968 2 Sheets-Sheet 2
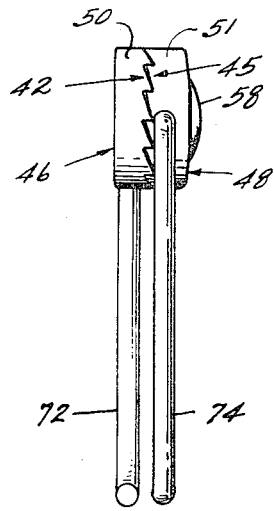
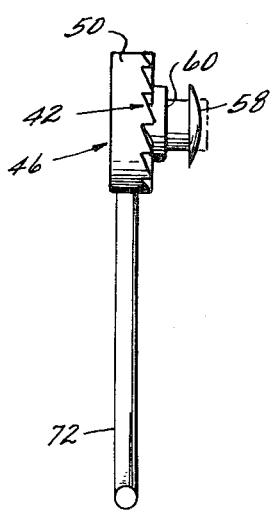
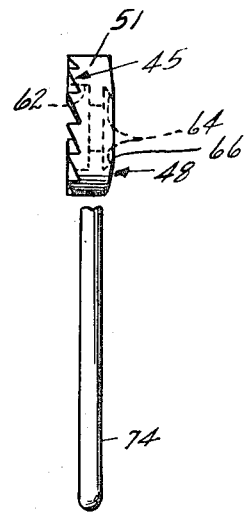
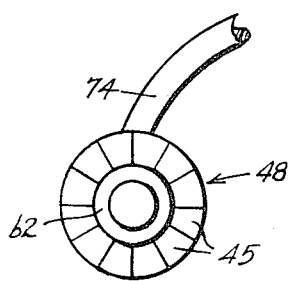
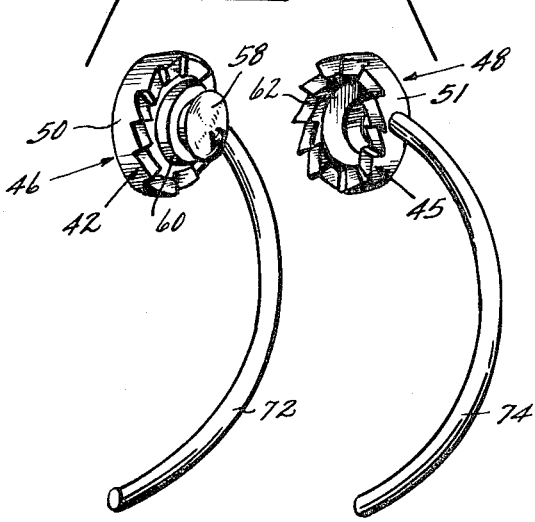
INVENTOR.
ROBERT K. SHEEHAN
BY
Pearce and Schaeperklaus
ATTORNEYS

United States Patent Office 3,546,750
Patented Dec. 15, 1970

1

3,546,750
FASTENER
Robert K. Sheehan, Anderson Township, Hamilton County, Ohio (6941 Maidmarian Court, Cincinnati, Ohio 45230)
Filed Oct. 25, 1968, Ser. No. 770,594
Int. Cl. A44b 21/00
U.S. Cl. 24—16                                              4 Claims

ABSTRACT OF THE DISCLOSURE

A fastener or cable tie comprising a pair of cooperating head members each having a set of ratchet teeth formed therein and which engage or mesh with a set of ratchet teeth in the other of said head members, a pair of curved cooperating arms each mounted upon its respective head member, the head members being pivotable about each other and rotatable about a common axial bearing, whereby rotation of one member relative to the other in one direction will cause the curved arm members to move towards each other to simulate a decreasingly smaller circle, thereby clamping cables, strands, and the like tightly and retaining same without the cable tie opening up, the set of ratchet teeth of one head locking the set of ratchet teeth in the other head to prevent reversed relative rotation of said heads and arm members.

BACKGROUND OF THE INVENTION

Field of the invention

The field of art to which the invention is most likely to pertain is generally located in the class of devices related to fasteners. Class 24, Buckles, Buttons, Clasps, Etc., and Class 248, Supports, United States Patent Office Classifications, appear to be the general areas of art in which the claimed subject matter of the type involved here has been classified in the past.

Description of the prior art

Fasteners and the like, of the type involved here, are disclosed in the following U.S. Letters Patent; Nos. 470,-117; 2,884,214; 2,970,353; and 3,030,681.

SUMMARY

This invention relates to cable ties, fasteners, and the like for clamping, retaining or otherwise holding together a bundle of materials, examples of which are strands, cables, wires and the like, and particularly, relates to what is commonly referred to as a cable tie.

An object of this invention is to provide for a novel fastener or cable tie device.

Another object of the invention is to provide for such a device which once tightened or clamped upon a bundle of material such as wires, strands, cables or the like, the clamping effect achieved is not weakened.

A further object of this invention is to provide for a locking arrangement of features in the device so that when it is clamped about such a bundle, the device will not release or open and unclamp the bundle.

A further object of the invention is to provide for a novel device as described above and hereinafter which is simple in fabrication and construction, economical in manufacture and cost, and being formed of a lightweight but sturdy and durable material, and which is functional for the purposes of the device.

These and other objects and advantages will become more apparent upon a fuller reading of the description following, the appended drawings comprising two sheets, and the appended claims hereto.

2

BRIEF DESCRIPTION OF THE DRAWING

FIG. 1 is a plan view of a fastener embodying the invention.

FIG. 2 is an elevational view of such a fastener, such view being 90° from that of the view in FIG. 1.

FIG. 3 is the perspective view of the fastener embodying the invention clamping together a bundle of materials.

FIG. 4 is a perspective exploded view of a fastener embodying the invention.

FIG. 5 is an elevational view of one-half of the fastener of FIG. 1.

FIG. 6 is an elevational view of a corresponding half of the fastener shown in FIGS. 1 and 2.

FIG. 7 is an enlarged sectional view of a portion of the fastener.

FIG. 8 is an end plan view of a modification embodying the invention.

FIG. 9 is an end plan view of one-half of the fastener shown in FIG. 8.

FIG. 10 is an end plan view of the other half of the fastener shown in FIG. 8.

FIG. 11 is an exploded perspective view of the modification of the invention shown in FIG. 8.

FIG. 12 is a fragmentary elevational full view of an element of the modification illustrated in FIGS. 8–11.

DESCRIPTION OF THE PREFERRED EMBODIMENT

Referring now to the drawing in which reference characters therein correspond to numerals herein, reference character 20 refers generally to a fastener shown in FIGS. 1–7 and which embodies the envention. Fastener 20 comprises a pair of curved arms 22, 24, each mounted upon a corresponding or associated head members 26, 28, respectively, and preferably integrally formed therewith. At their joining ends to their respective head members, curved arms 22, 24 are generally radially mounted and then continue to extend from such head members in such a manner as to generate semi-circular patterns, ultimately suggesting together a circular configuration, as suggested by their positions in fastener 20 shown in FIG. 2, i.e., when head members 26, 28 are rotated about each other to place such curved arm members in such a disposition. Curved arms 22, 24 cooperate with each other when fastener 20 is clamped to a bundle of materials 29 so as to clamp and retain such materials between them.

Each head member 26, 28 is preferably disc shaped and solid, and includes a flat peripheral wall 30, 31, respectively, from each of which curved arm members 22, 24 respectively project. A set of ratchet teeth 32 is formed on a round element 33 attached to and preferably integrally molded upon the inner face 34 of solid head member 26, while a meshing set of ratchet teeth 35 are integrally formed internally of solid member 28 about a recess 36 developed from inner face 37 into solid member 28. A rivet 38, preferably integrally and centrally formed of head member 26, extends into recess 36 and onto and through an aperture 39 centrally formed in head member 28, so as to provide for a common axial bearing for both head members 26, 28. Upon assembly together of head members 26, 28 by inserting rivet 38 through aperture 39, that portion of rivet 38 extending through aperture 39 is smashed down so as to retain head member 28 in cooperative engagement with head member 26, their respective sets of ratchet teeth 32, 35 meshing with each other. Inner faces 34, 37 of head members 26, 28 respectively, abut each other and freely slide one over the other in opening and closing cable tie 20.

The assembly of the elements forming fastener 20 is apparent from a reading of the above description taken in conjunction with FIGS. 1–7 of the drawing, and a further description of such assembly does not appear to be necessary. In operation, one head member and its associated curved arm is rotatable about the other head member and its associated arm in one direction only, as the meshing sets of ratchet teeth 32, 35 afford but one direction of relative rotation of head members 26, 28. To clamp and retain a bundle of material 29, such as shown in FIG. 3, an arm, say 22, is first rotated clockwise (as seen in FIG. 3) into a position where the other curved arm 24 is set against bundle 29. Thereafter, curved arm 22 is further rotated in a clockwise manner (as viewed in FIG. 3) to close about the exposed remainder of bundle 29.

The material out of which fastener 20 is formed is preferably from plastic or the like, or other material readily cuttable by a cutting instrument so that curved arms 22, 24 may be severed thereby releasing a bundle 29, should it be desired.

In particular, however, the character of the sets of meshing teeth 32, 35 should include an elastic property for the purpose of rotating the set of teeth 32 about (or within) the set of teeth 35, and nevertheless retain the flexible quality for the sets of teeth 32, 35 to lock one with the other (when meshed) were an effort made to reverse rotation of head members 26, 28. In other words, as each tooth's outer surface in the set of ratchet teeth 32 frictionally slides or dwells across a corresponding surface of a tooth formed in the set of ratchet teeth 35, during rotation of one head member with respect to the other, a certain amount of compression or distortion of round element 33 and its set of ratchet teeth 32 may occur, until each tooth of the respective sets of teeth 32, 35 mesh with its next succeeding surface provided between each tooth in the opposing set of teeth. Such compression or distortion is generally due to the limited space in which round element 33 is disposed. However, whatever disadvantage there may be in effecting facile rotation of one head member about the other, such is effectively eliminated by providing for a slightly smaller diameter, from tooth edge to tooth edge, in round element 33, than the greatest diameter provided in recess 36. Such engineering dimensions do not prevent the effective locking of the set of ratchet teeth 32 by its meshing with the teeth of set 35, when members 26, 28 are rotated in one direction only about each other on common axial bearing or rivet 38.

It should now be apparent that once fastener or cable tie 20 is clamped about a bundle 29, it cannot be opened by reversing rotation of head members 26, 28.

A modification of the invention is illustrated in FIGS. 8–12. In this embodiment, each set of ratchet teeth 42, 45 is mounted on the inner walls of its associated disc-shaped head member 46, 48, respectively, and along its respective peripheral wall 50, 51, in such manner that the sets 42, 45 face one another with their corresponding teeth engaging and meshing each other. An axial bearing rivet 58 maintains head members 46, 48 together in the same general fashion as in the embodiment illustrated in FIGS. 1–7. A shoulder 60 is provided on rivet 58 and onto which a recess 62 formed in head member 48 is slip-fitted. Such an arrangement maintains the set of teeth 42 on head member 46 in a desired relation to its corresponding set of meshing teeth 45 on head member 48, so that facile rotation of one head member about the other is achieved. An annular lip 64 (FIG. 10) is formed on or in outer face 66 of head member 48, against which the head of rivet 58 rides. Thus, in rotation of one head member with respect to the other, a certain amount of give is axially provided for head member 48 so that as the teeth in set 45 ride upon the dwelling surfaces between the teeth of set 42, the rotation between the head members 46, 48 is facilitated. The teeth of both sets 42, 45 once again mesh or engage and lock as curved arms 72, 74 close towards each other with rotation in one direction only of head members 46, 48.

Pursuant to the requirements of the patent statutes, the principle of this invention has been explained and exemplified in a manner so that it can be readily practiced by those skilled in the art to which it pertains, or with which it is most nearly connected, such exemplification including what is presently considered to represent the best embodiment of the invention. However, it should be clearly understood that the above description and illustrations are not intended to unduly limit the scope of the appended claims, but that therefrom the invention may be practiced otherwise than as specifically described and exemplified herein, by those skilled in the art, and having the benefit of this disclosure.

Therefore, what I clam as patentably novel is:

1. A fastener comprising in combination,
   a pair of assembled head members,
   a pair of curved arm members each being securely mounted on a respective one of said head members, generating together generally a circular configuration upon closing one towards the other,
   a set of ratchet teeth in each head member in meshing cooperative relation with the teeth in the other,
   said head members having a common axis for rotation relative to each other in one direction only,
   the ratchet teeth having suitable resilience such that one set disengages with the ratchet teeth in the other set during relative rotation of one of said head members relative to the other in a predetermined direction, but engagingly remeshes during rotation in a direction opposite to said predetermined direction to substantially limit said curved arms to closing movement towards each other,
   each successive engagement of corresponding teeth of both sets locking said fastener in a manner preventing reverse relative rotation of said head members.

2. The fastener of claim 1 in which a first set of ratchet teeth is mounted upon the inner face of one head member and a second set of ratchet teeth disposed in the other head member and formed about a recess therein, said first set of teeth meshing with said second set of teeth upon assembly of said head members about the common axis for relative rotation.

3. The fastener of claim 1 in which a first set of ratchet teeth is mounted on the inner face along a peripheral wall of one of the head members, a second set of ratchet teeth is mounted on the inner face along a peripheral wall of the other of said head members, the first and second sets of teeth meshing with each other upon assembly of said head members about the common axis for relative rotation.

4. The fastener of claim 3 in which an annular lip is concentrically formed in the outer face of one of said head members, whereby give is provided for said one of said head members during the relative rotation of said head members as said curved arm members close towards each other.

References Cited

UNITED STATES PATENTS

| | | | |
|---|---|---|---|
| 742,282 | 10/1903 | Block | 151—13X |
| 1,262,242 | 4/1918 | Owens | 151—13 |
| 2,718,894 | 9/1955 | Gresham et al. | 24—248HCX |
| 2,947,054 | 8/1960 | Adams | 24—248E |

DONALD A. GRIFFIN, Primary Examiner

U.S. Cl. X.R.

24—248